(12) United States Patent
Nemoto et al.

(10) Patent No.: US 8,443,840 B2
(45) Date of Patent: May 21, 2013

(54) EXCESSIVE PRESSURE RELEASE VALVE AND RELEASE VALVE UNIT HAVING THE RELEASE VALVE

(75) Inventors: Masashi Nemoto, Saitama (JP); Yukio Yaginuma, Saitama (JP); Takeo Yamashita, Saitama (JP)

(73) Assignee: Asahi Rubber Inc., Saitama (JP)

( * ) Notice: Subject to any disclaimer, the term of this patent is extended or adjusted under 35 U.S.C. 154(b) by 371 days.

(21) Appl. No.: 12/450,006

(22) PCT Filed: Feb. 14, 2008

(86) PCT No.: PCT/JP2008/052429
§ 371 (c)(1),
(2), (4) Date: Sep. 8, 2009

(87) PCT Pub. No.: WO2008/111356
PCT Pub. Date: Sep. 18, 2008

(65) Prior Publication Data
US 2010/0032039 A1    Feb. 11, 2010

(30) Foreign Application Priority Data

Mar. 9, 2007   (JP) ................................ 2007-059682

(51) Int. Cl.
*F16K 15/14*   (2006.01)
(52) U.S. Cl.
USPC ......................................................... 137/845
(58) Field of Classification Search
USPC .................................. 137/843, 845
See application file for complete search history.

(56) References Cited

U.S. PATENT DOCUMENTS

| | | | |
|---|---|---|---|
| 3,664,875 A | | 5/1972 | Graf |
| 3,799,427 A | * | 3/1974 | Goglio ........................... 383/103 |
| 4,518,014 A | * | 5/1985 | McAlpine ..................... 137/843 |
| 4,550,749 A | * | 11/1985 | Krikorian ...................... 137/843 |
| 5,267,966 A | * | 12/1993 | Paul ........................ 604/167.04 |
| 5,794,661 A | * | 8/1998 | Natalizia ....................... 137/849 |
| 6,202,766 B1 | * | 3/2001 | Shepherd ....................... 175/228 |
| 6,481,464 B1 | * | 11/2002 | Katayama et al. ............ 137/843 |
| 2003/0122095 A1 | * | 7/2003 | Wilson et al. ................... 251/12 |
| 2005/0152091 A1 | | 7/2005 | Okamura et al. | |

FOREIGN PATENT DOCUMENTS

| | | |
|---|---|---|
| FR | 2 212 019 A5 | 7/1974 |
| JP | A-60-157156 | 8/1985 |
| JP | U-60-147157 | 9/1985 |
| JP | A-62-246960 | 10/1987 |

(Continued)

OTHER PUBLICATIONS

Aug. 31, 2011 Search Report issued in European Application No. 08711271.0.

*Primary Examiner* — Kevin Lee
*Assistant Examiner* — R. K. Arundale
(74) *Attorney, Agent, or Firm* — Oliff & Berridge, PLC (57) ABSTRACT

Provided is a small, simple-structured, homogeneous and mass-producible excessive pressure release valve which works even at a relatively low excessive pressure to surely and safely release the pressure to the external world. The excessive pressure release valve has an elastic rubber plate and a reversibly openable slit that passes through the upper and the lower surfaces and release the pressure to the external world when the internal excessive pressure stressing on the lower side surface, pushes and opens the slit toward upper surface side. The elastic rubber plate is made of silicone rubber containing 1-20% by mass of silicone oil.

12 Claims, 7 Drawing Sheets

FOREIGN PATENT DOCUMENTS

| | | |
|---|---|---|
| JP | U-63-152161 | 10/1988 |
| JP | 03168788 A * | 7/1991 |
| JP | A-05-047363 | 2/1993 |
| JP | A-08-282630 | 10/1996 |
| JP | A-10-118178 | 5/1998 |
| JP | A-10-511447 | 11/1998 |
| JP | A-2002-106766 | 4/2002 |
| JP | A-2003-100571 | 4/2003 |
| JP | A-2004-047971 | 2/2004 |
| JP | A-2004-071725 | 3/2004 |
| JP | A-2005-214406 | 8/2005 |
| WO | WO 96/20365 A1 | 7/1996 |

* cited by examiner

EXCESSIVE PRESSURE RELEASE VALVE AND RELEASE VALVE UNIT HAVING THE RELEASE VALVE

TECHNICAL FIELD

The present invention relates to an excessive pressure release valve having rubber elasticity that safely release an excessive internal pressure to the external world from sealed containers of a closed system such as fuel cells, electrolysis tanks of secondary cells, reaction vessels, storage containers etc. or sealed piping systems, and the present invention also relates to a release valve unit having such valve.

BACKGROUND ART

The secondary cells such as fuel cells, nickel-cadmium cells, nickel-hydrogen cells, lithium-ion cells, lead batteries etc. are used for power supplies of automobiles or portable electronic devices and home electric appliances such as cell-phones, laptop personal computers, and so on.

These cells each have a safety valve to automatically release a pressure to the external world when an internal pressure becomes excessively high.

For example, Japanese Unexamined Patent Publication No. JP 05-47363A discloses a sealed-type secondary cell comprising a curved space portion and a safety valve portion where the curved space portion communicates with a space stored with electrode plates at a part of a connection portion in the periphery of connected films where the electrode plates are sandwiched in between while the safety valve portion has a small opening or a slit that passes through from one film's outer surface to the other film's out surface. However, with the development of recent downsizing technique in battery cells and home electric appliances, there is a demand for smaller and simpler safety valves that can surely and safely work at a relatively low excessive pressure and release the excessive pressure to the external world.

Specifically in a case of fuel cells that use hydrogen as fuel where the internal pressure might become excessively high due to oversupply of hydrogen, overheating, overreaction and so on, it is desired to set up a high-precision safety valve that can automatically release an excessive pressure to the external world. Further, it is also desired to set up an inexpensive, mass-producible, homogenous, general-purpose compact-sized safety valve for electrolysis tanks of fuel cells or secondary cells, cases for portable electronic devices and their sealing components, air piping, storage containers for volatile chemicals or sparkling beverages.

Japanese Unexamined Patent Publication No. JP 10-118178A discloses a medical check valve comprising a concave portion dented like an inverted cone shape on the upper surface side, a convex portion on the lower surface side protruded in the same direction as that of the protrusion of the concave portion and a syringe-insertion opening formed so as to pass through the lowermost point of the concave portion. The medical check valve is used for reliable co-injection, with easy-to-use operation, of fluid medicines pre-filled in a syringe at the time of fluid infusion or blood transfusion. The medical check valve has a difficulty in providing a uniform insertion opening, without misalignment, at the lowermost point of the small concave portion for whole product lines. However, even when there are some misalignments, doctors and nurses strongly insert a syringe manually to widen the slit and then press a pusher of the syringe to co-inject the solution of the syringe, therefore improper operation of the valve can be prevented. However, this medical check valve cannot be used as an excessive pressure release valve for the fuel cells and the like, because the excessive pressure release valve of the fuel cells must work automatically and accurately to release the pressure toward the external world only when the internal pressure becomes excessively high.

On the other hand, Japanese Unexamined Patent Publication No. JP 2002-106766A discloses a compact-sized tube coupling mountable with one simple operation on an external fluid device, which comprises a joint body with a locking claw and an attaching portion to attach the joint body to a coupling opening of the external fluid device. Because this tube coupling is used for flowing of fluid, a release valve is not provided along a route of the fluid.

DISCLOSURE OF THE INVENTION

The present invention was developed to solve the problems described above. An object of the present invention is to provide a small-sized, simple-structured and homogenously mass-producible excessive pressure release valve that can release pressure safely accurately and reliably to the external world even when the excessive pressure is relatively low, and also relates to a release valve unit having the same.

The excessive pressure release valve which was developed to achieve the objects described above comprises:
  an elastic rubber plate having an upper surface and a lower surface; and
  a reversibly openable and closable slit passing through the upper and lower surfaces of the rubber plate for releasing an internal excessive pressure to the external world when the slit is pushed and opened toward the upper surface side by the internal excessive pressure stressing on the lower surface side of the elastic rubber plate.

The slit of the excessive pressure release valve is shaped into a straight line, U-shape, V-shape, S-shape or cross line.

The elastic rubber plate of the excessive pressure release valve has a thick portion at a peripheral portion thereof.

The elastic rubber plate of the excessive pressure release valve has:
  a dent at a central portion of the lower surface side of the elastic rubber plate and the slit passing through a central flat portion of the dent, or
  a mound at a central portion on the upper surface side of the elastic rubber plate and the slit passing through a central flat portion of the mound.

The elastic rubber plate of the excessive pressure release valve has a thickness ranging from 0.3 to 20 mm, a diameter ranging from 2 to 40 mm, a Durometer A hardness ranging from A20 to A80 according to Japanese Industrial Standard: K6253 and a proportion of the entire length of the slit in the diameter ranging from 5 to 80%.

Material of the elastic rubber plate of the excessive pressure release valve is a silicone rubber.

The elastic rubber plate is made of the silicone rubber containing 1 to 20% by mass of silicone oil.

An excessive pressure release unit comprises:
  a closed-system of a container, piping and/or an external connector to be connected thereto, and
  an excessive pressure release valve mounted on the closed-system;
  wherein the excessive pressure release valve has an elastic rubber plate for releasing an internal excessive pressure in the closed-system,
  the elastic rubber plate has;
  an upper surface and a lower surface; and
  a reversibly openable and closable slit passing through the upper and lower surfaces of the elastic rubber plate for releasing an internal excessive pressure to the external world when the slit is pushed and opened toward the upper surface side by the internal excessive pressure stressing on the lower surface side of the elastic rubber plate.

In the excessive pressure release unit, the excessive pressure release valve is fixed to the container, the piping and/or the external connecter to be connected thereto by way of adhesion using a thermal adhesive film or an adhesive agent attached to the lower surface side of the elastic rubber plate; or by way of covering of an outer edge portion of the elastic rubber plate using a guide attached to the container, the piping and/or the external connector to be connected thereto.

In the excessive pressure release unit, the excessive pressure release valve and the container, the piping and/or the external connector to be connected thereto are fixed by way of fitting the elastic rubber plate into the container, the piping and/or the external connector, or by way of holding an outer edge portion of the elastic rubber plate by using a washer, a hollow pipe or a hollow screw.

In the excessive pressure release unit, the elastic rubber plate is compressed and subjected to a resulting compression pressure so that the excessive pressure to be released is adjusted based on the compression pressure.

The excessive pressure release valve of the present invention has an excellent performance in accurately reliably and safely releasing an excessive pressure widely ranging from a relatively low pressure of about 10 kPa to a pressure of about 2,000 kPa. The excessive pressure release valve is formed to be a small and simple structure and can be manufactured homogeneously, inexpensively and on a massive scale, thus being excellent in productivity. In addition, the excessive pressure release valve can be freely changed in design so as to fit thereof to the shape of the tank, the container or the piping whose internal pressure is to be adjusted. In addition, the excessive pressure release valve can be designed to work at an arbitrary pressure based on the level of the excessive pressure to be released.

In the present invention, the excessive pressure release valve is mounted on the container, piping or the external connector connected to the closed-system container or piping. Although the excessive pressure release unit of the present invention has a small and simple structure, but pressure is safely and surely released to the external world.

The excessive pressure release unit of the present invention has a small and simple structure in which the excessive pressure release valve is mounted on the closed-system container or piping, or the external connector connected thereto. In spite of such small and simple structure, the present unit can release the pressure safely and surly to the external world.

TYPICAL REFERENCE NUMERALS ARE

1: excessive pressure release valve, 2: excessive pressure release unit, 10: elastic rubber plate, 11, 11(*a*), 11(*b*), 11(*c*) and 11(*d*): slit, 12: upper surface side of the elastic rubber plate, 13: lower surface side of the elastic rubber plate, 14: electrolysis tank, 15: thick portion, 16: uneven-stepped thick portion, 17: attachment part, 18: dent, 19: mound, 20 and 21: clamp, 22: ring-like spacer, 23: thick portion, 24: wall, 25: thermal adhesion film, 26: guide, 27: hollow male screw, 28: external connector, 29: plunger, 30: claw, 31: annular packing, 32: pipe, 33: filter

DETAILED EXPLANATION OF THE INVENTION

Hereunder, the embodiments of the present invention are explained in detail, but the scope of the present invention is not intended to be limited to these embodiments.

Figure 1:
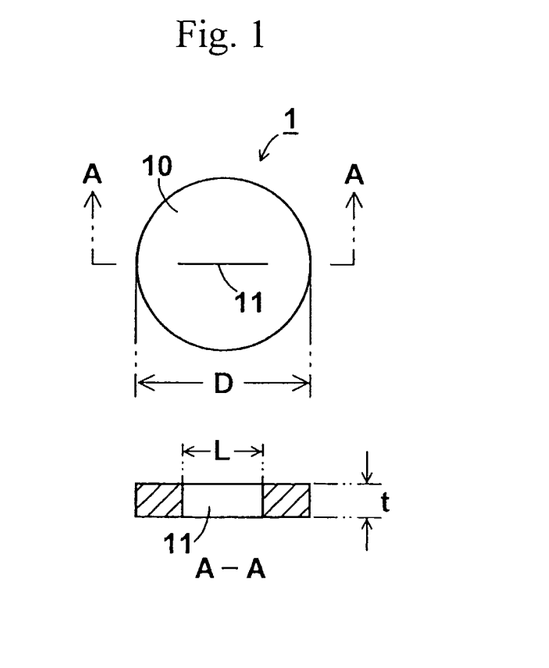
FIG. 1 is a plain plain view and a cross-sectional side view illustrating an embodiment of an excessive pressure release unit using an excessive pressure release valve of the present invention.

The present invention is explained with reference to FIG. 1. An excessive pressure release valve 1 has a disk-shaped elastic rubber plate 10 made of a silicone rubber containing a silicone oil. A straight slit 11 is formed by cutting the disk-shaped elastic rubber plate 10. Wall surfaces of the slit 11 are closely contacted with each other but can be sealed and separated smoothly without adhering to each other because the silicone oil which seeps out from the elastic rubber plate 10 lies between the walls of the slit.

In this embodiment, the silicone oil is contained in the elastic rubber plate of the silicone rubber, but the elastic rubber plate without the silicone oil may be used, too.

Figure 2:
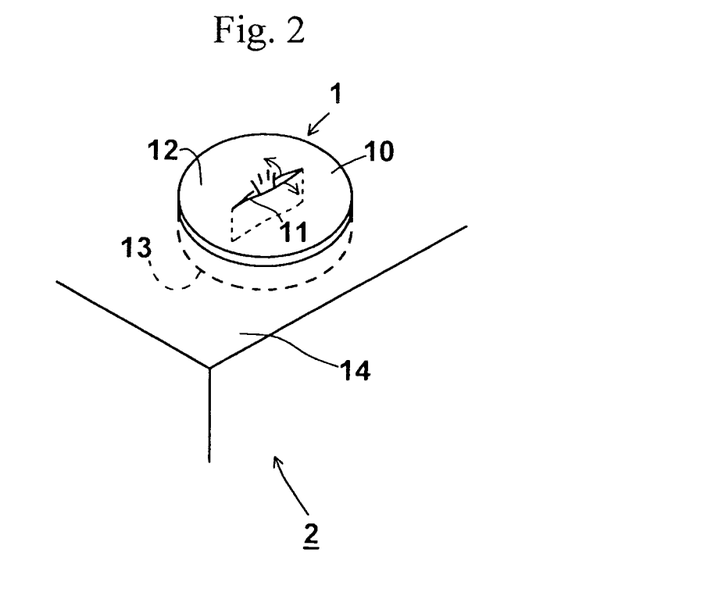
FIG. 2 is a perspective view showing the excessive pressure release valve in operation.

As shown in FIG. 2, for example, the excessive pressure release valve 1 is fitted into an upper wall of an electrolysis tank 14 of a fuel cell and used as an excessive pressure release unit 2. During the operation of the fuel cell, when the internal pressure in the electrolysis tank 14 is increased due to oversupply of hydrogen fuel or overheating and when the internal pressure exceeds a prescribed excessive pressure, stress is applied on the lower surface side 13 of the slit 11 of the elastic rubber plate 10 by this increased pressure. The slit 11 is pushed and widened to release the pressure to the external world, so that the internal pressure returns to a prescribed safe range. Then the slit 11 is pushed back to an original close-contact state by the elasticity of the elastic rubber plate 10.

A threshold value of the excessive pressure to be released through the excessive pressure release valve 1 can be arbitrary adjusted by appropriately selecting the thickness t, the diameter D, material, the shape and a compression ratio of the elastic rubber plate 10, shape and entire length of the slit 11, and an operation temperature. The threshold value of the excessive pressure is preferably adjusted within a range of 50-200 kPa.

Practically, thickness t of the elastic rubber plate 10 is set up within a range of 0.3-20 mm. In particular, when used for containers for batteries such as fuel cells, the more preferable thickness falls in the range of 0.5-1 mm from the viewpoint of downsizing technique. It may also depend on the hardness and the diameter of the elastic rubber plate 10. If the thickness is thinner than this range, temperature dependency and lot-to-lot variation in the working pressure at the time of releasing the excessive pressure become large, and restorability after the release and reproducibility of the working pressure of the release becomes deteriorated. If the thickness is thicker than this range, releasing higher excessive pressure can be realized but the increase in the slit thickness tends to cause a variation in the working pressure.

Practically the diameter D of the elastic rubber plate 10 is in the range of 2-40 mm. In particular, for the containers for batteries such as the fuel cells, the diameter is preferably in the range of 2-20 mm, more preferably in the range of 2-10 mm, still more preferably in the range of 2-6 mm though it may also depend on the hardness and thickness of the elastic rubber plate 10. When the diameter becomes too large, the production cost increases and it adversely affects the downsizing technique, too.

Concerning the material for the elastic rubber plate 10, silicone rubber, or natural or synthetic polymers having the rubber elasticity or elastomers can be used. Synthetic rubber such as butyl rubber, acrylonitrile-butadiene rubber and isoprene rubber can be used, and natural rubber can also be used.

In particular, silicone rubber having an excellent heat resistance, the high softening temperature, low-temperature resistance and low brittle temperature, is preferable. Dimethyl silicone rubber (MQ), methyl vinyl silicone rubber (VMQ), methyl phenyl vinyl silicone rubber (PVMQ) and fluoro silicone rubber (FVMQ) can be specifically exemplified as such silicone rubbers. The Silicone rubber is stable over a broad range of temperature. Changes in Young's modulus and spring constant are small over a service temperature of containers and pipes from which the excessive pressure is to be released. Therefore, the silicone rubber is more preferably used than other rubbers.

The silicone rubber preferably contains silicone oil in a concentration of 1-20% by mass. Phenyl silicone oil, dimethyl silicone oil, methyl vinyl silicone oil, methyl phenyl silicone oil etc. can be exemplified as the silicone oil. In combination with the silicone rubber and the silicone oil, the more the solubility parameters (SP value) of them are apart from each other, the more the openability of the slit 11 of the elastic rubber plate 10 is improved due to seepage of the silicone oil. That is, by the presence of the oil, the slit 11 is tightly closed when the internal pressure is within an allowable pressure and the slit 11 is likely to be opened and widened when the slit is subjected to an excessive pressure. This solubility parameter • is derived from the regular solution theory and is a value defined by the following equation:

$$•=(•H/V)^{1/2}$$

wherein •H: molar heat of vaporization of non-polymerizable liquid
V: molar volume.

When methyl vinyl silicone rubber (VMQ) is selected as a silicone rubber, it is preferable that methyl phenyl silicone oil be selected as silicone oil. When methyl phenyl vinyl silicone rubber (PVMQ) is selected as the silicone rubber, it is preferable that dimethyl silicone oil be selected as the silicone oil. As described above, by appropriately selecting ingredients for the elastic rubber plate 10, hardness of the elastic rubber plate 10 can be adjusted in a range of A20-A80 (Durometer A hardness, JIS K6253), preferably in a range of A28-A73.

The elastic rubber plate 10 can be shaped into a full circular plate. The plate 10 having an elliptic disk, polygonal disk such as a rectangular disk and regular tetragonal disk whose four corners are cut off can be used so as to meet the requirements of the shape, size and downsizing of tanks and containers containing the excessive pressure to be released. Of them, the full circular plate disk can be preferably used because it can be manufactured easily and homogeneously and can release the excessive pressure more reliably and accurately.

Figure 3:
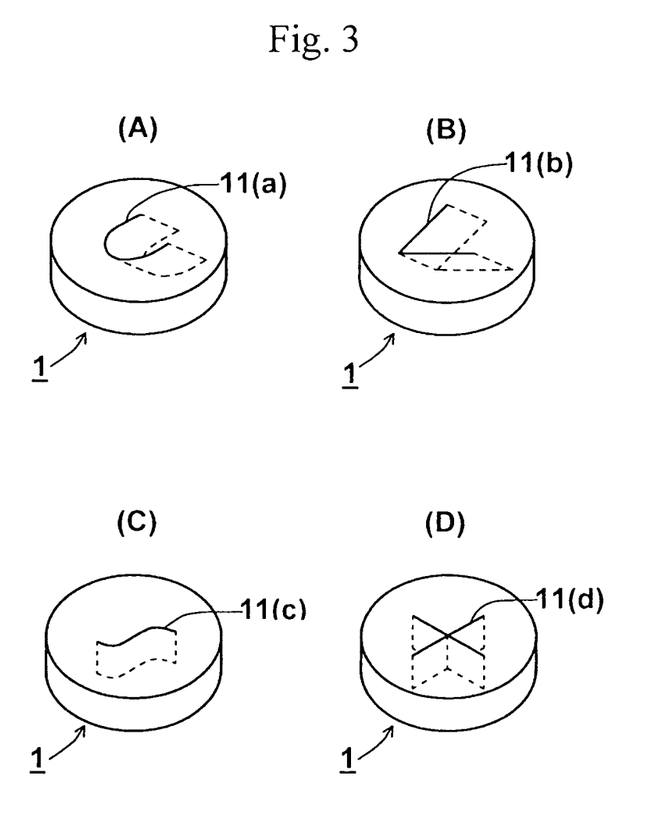
FIG. 3 is a perspective view showing other embodiments of the excessive pressure release valve.

The slit 11 can be formed vertically or in a slant manner with respect to the upper and the lower surfaces 12 and 13 of the elastic rubber plate 10. When the slit is formed into a slant manner, the performance as a function of a check valve is improved. The slit 11 can be for example a U-shaped slit 11(a) provided in a slant manner as shown in FIG. 3 (A), V-shaped slit 11(b) provided in a slant manner as shown in FIG. 3 (B), S-shaped slit 11(b) provided perpendicularly as shown in FIG. 3 (C) or cross-shaped slit 11(d) provided perpendicularly as shown in FIG. 3 (D). As described above, when the slit 11 is made into the curved or cross-shaped slit, the entire length of the slit 11 can be longer than that of the straight-lined slit 11, so that the excessive pressure release valve 1 can be made into a further smaller and operated even at a lower excessive pressure. Further, the slit 11 can be •-shaped or W-shaped. However, there is a fear that if the entire length of the slit 11 is made longer by adopting a more complicated shape, the surface of the slit is uplifted and got stuck on the upper surface side and cannot returned to its original closed position.

Figure 4:
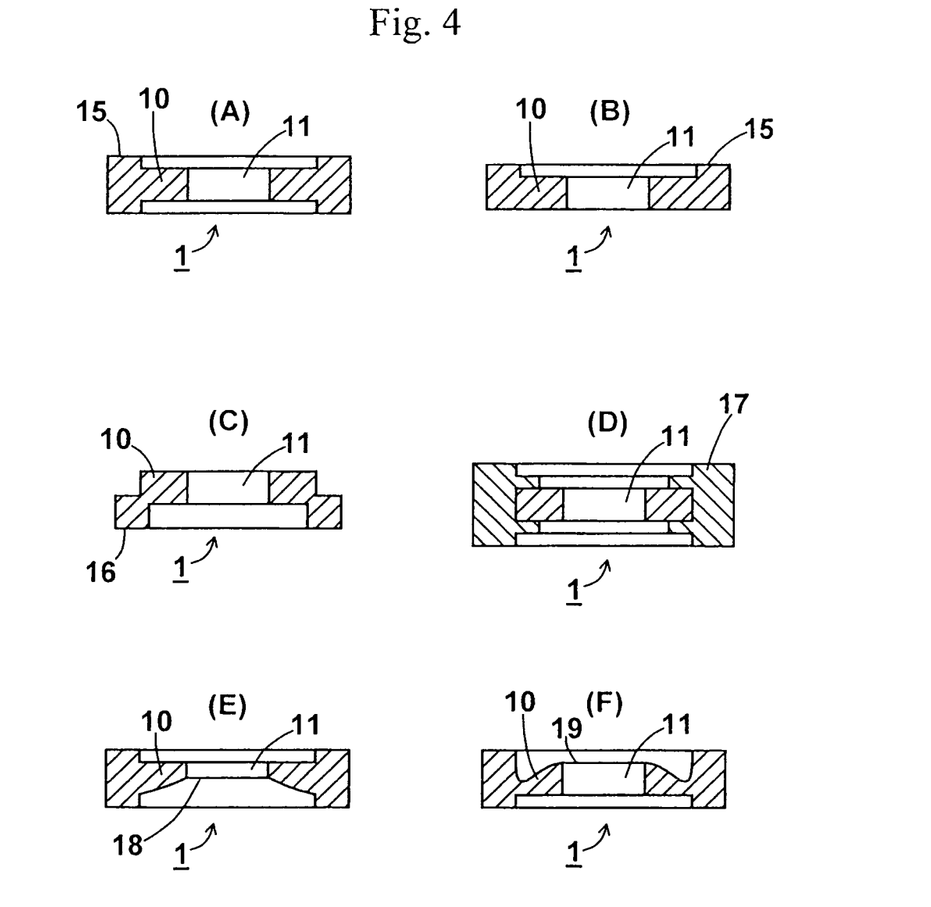
FIG. 4 is a cross-sectional side view of other embodiments of the present excessive pressure release valve.

The elastic rubber plate 10, as shown in FIG. 4 (A) and 4 (B), may have an integrated thick portion 15 extending from the peripheral portion to the edge of the plate 10. By holding and squeezing the thick portion 15 using spacers, washers or tightening tools, the thick portion 15 is fixed to the tank or the container whose excessive pressure is to be released. By adjusting the squeezing level or compression ratio at the thick portion 15, a working pressure to release the excessive pressure can be adjusted appropriately As shown in FIG. 4 (C), an uneven-stepped thick portion 16 may be adopted. The uneven-stepped thick portion 16 can be used to release the suddenly increased excessive pressure by breaking of the connection portion between the elastic rubber plate 10 and the uneven-stepped thick portion 16 at the time of emergency in which the internal pressure rapidly increases and the excessive pressure cannot be properly released. As shown in FIG. 4 (D), the periphery of the excessive pressure release valve 1 can have an attachment part 17 made of metal, a hard rubber or a hard plastic tightly attached to the excessive pressure release valve 1 by fitting, adhesion or compression molding. As shown in FIG. 4 (E), the elastic rubber plate 10 is dented at its central portion on the lower surface side, and the slit 11 which passes through the central flat portion of the dented portion 18 is formed. With this structure, responsiveness of the pressure adjustment with respect to the increase in the internal pressure is improved. As shown in FIG. 4 (F), the elastic rubber plate 10 has a mound at the central portion thereof on the upper surface side. The slit 11 may pass through a central flat portion of the mound 19. With this structure, the performance as a function of a check valve is further improved. The slit 11 is formed by cutting the flat portion, so that there is no need to adjust the cutting direction. In FIG. 4 (F), like in FIG. 4 (C), a thinner portion between the thickened peripheral portion and the elastic rubber plate 10 is broken so as to release the excessive pressure at the time of emergency in which a rapid increase in the excessive pressure cannot be properly released.

Practically the proportion of the entire length L of the slit 11 in the diameter D of the elastic rubber plate 10 is in the range of 5-80%, more preferably 20-80%. When the proportion is less than 5%, the shape of the slit 11 becomes like a pinhole, so that a lot-to-lot variation in working pressure is observed. On the other hand, if the proportion exceeds 80%, an overlap portion or a holding margin becomes too narrow, and thus the lot-to-lot variation in working pressure of the excessive pressure release are observed and the edge of the slit 11 tends to be torn and ruptured to the edge of the rubber plastic plate 10.

To let the excessive pressure release function of the slit 11 fully work, for example in a case where the shape of the slit 11 is a straight line, the diameter D is set to 2 mm and an appropriate entire length L is in the range of 0.1-1.6 mm; the diameter D is set to 3 mm and an appropriate entire length L is in the range of 0.15-2.4 mm; the diameter D is set to 5 mm and an appropriate entire length L is in the range of 0.25-4 mm, respectively. The threshold value of the excessive pressure to be released may also be adjusted by changing the entire length of the slit 11.

In the case of using the excessive pressure release valve for an energy storage container for hydrogen gas or methanol and water etc. of batteries such as fuel cells for cell-phones or laptop personal computers etc., it is especially desirable to provide an elastic rubber plate which has a thickness of 0.3-1 mm, diameter of 2-5 mm, Durometer A hardness of A20-A80 according to JIS K6253 and proportion of the entire length of the slit in the diameter of 20-80%.

This excessive pressure release valve 1 can be used for the fuel cells containing an anode and a cathode and secondary batteries such as nickel-cadmium batteries, nickel-hydride batteries, lithium-ion batteries, lead batteries etc. This excessive pressure release valve 1 can be attached to a closed reaction vessel such as a micro-reactor or its piping.

Figure 5:
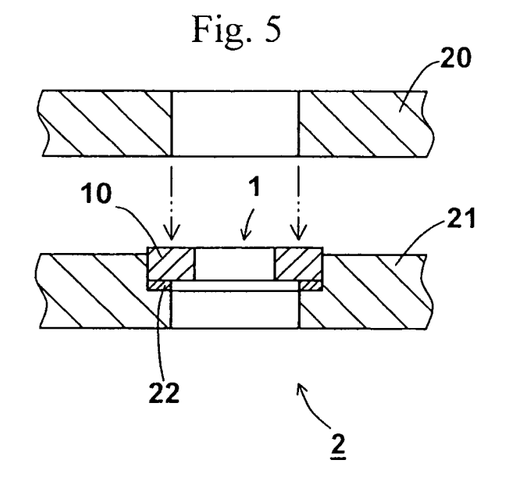
FIG. 5 is a cross-sectional side view of other embodiments of the present excessive pressure release valve in an assembly stage.
Figure 6:
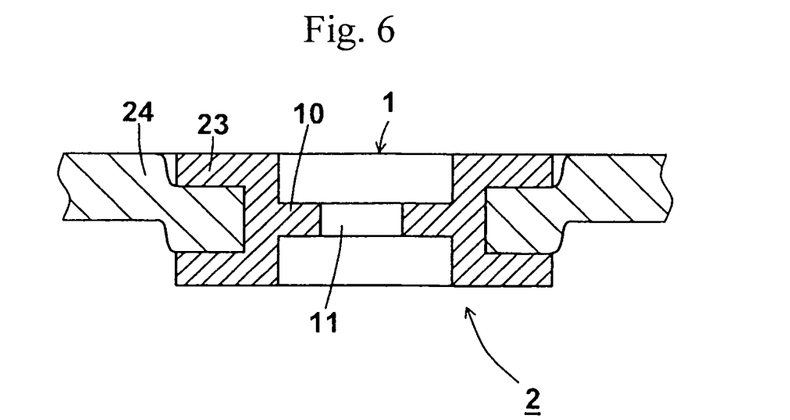
FIG. 6 is a cross-sectional side view of another embodiment of the present excessive pressure release valve in operation.

As shown in FIG. 2, mounting of the excessive pressure release valve 1 can be carried out by fitting or bonding to the walls of the tanks or the containers. As shown in FIG. 5, the mounting can be carried out by holding, compressing and fastening the vicinity of the edge of the elastic rubber plate 10 from the upper and lower surfaces of the elastic rubber plate 10 of the excessive pressure release valve 1, using a clamp 20 having a hole, with or without a spacer 22. By appropriately adjusting the clamping strength, the working pressure for releasing the excessive pressure can be appropriately adjusted. In addition, as shown in FIG. 6, a double ring-like thick portion 23 at the periphery of the elastic rubber plate 10 of the excessive pressure release valve 1 can be fitted into a hole in the wall 24 of the container etc. such as the electrolysis tanks or the fuel cell containers.

In the case where the excessive pressure release valve 1 made of the silicone rubber is attached under a compressed state and subjected to a temperature ranging from room temperature to high temperature of about 200° C., variation of the threshold value of the excessive pressure to be released is suppressed to be very low because the variation is offset by expansion and softening of the silicone rubber caused by a high temperature.

Figure 7:
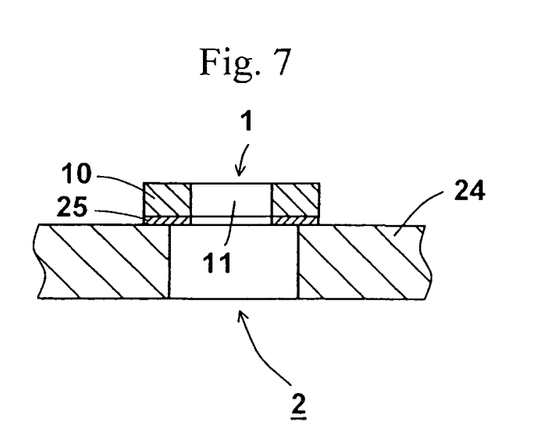
FIG. 7 is a cross-sectional side view of an excessive pressure release unit in operation.

FIG. 7 shows an example of another excessive pressure release valve unit 2. A hole formed on the wall 24 of the container is sealed by the excessive pressure release valve 1. The excessive pressure release valve 1 is bonded to the wall 24 of a container using a thermal adhesive film 25 attached to the lower surface side of the elastic rubber plate 10.

The thermal adhesive film 25 is made of a thermoplastic resin. Ethylene vinyl acetate (co-) polymer, polyamide, polyester, polyethylene and polypropylene can be exemplified as a thermoplastic resin. The thermal adhesive film preferably has a thickness of 1-200·m, more preferably 10-100·m. Though the thermoplastic resin has hardness higher than that of the elastic rubber plate made of silicone rubber, the thermoplastic resin can be used for the release of the excessive pressure because it is thin in thickness.

The excessive pressure release unit 2, for example, can be produced in a way described below. First, one surface of the thermal adhesive film is subjected to a primer treatment and then a liquid silicone rubber is coated on it by using a coater. The resulting film is subjected to heat hardening and heat adhesion, obtaining a thermal adhesive film 25. The thermal adhesive film is punched out roundly and then attached to the elastic rubber plate 10 integrally. Then it is pressure-bonded to the wall 24 of the container under high temperature heating. Then the slit 11 is formed at the center of the elastic rubber plate 10 by cutting the elastic rubber plate 10 by a blade, obtaining the excessive pressure release unit 2.

Adhesive agents can be used instead of the thermal adhesive film 25.

Figure 8:
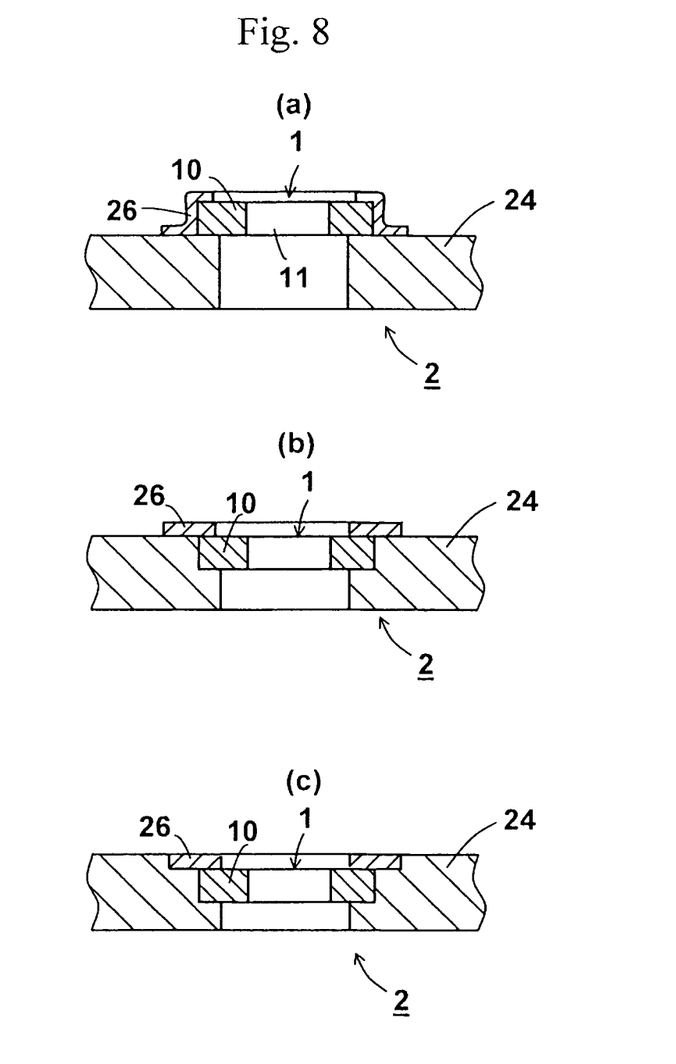
FIG. 8 is a cross-sectional side view of other excessive pressure release units in operation.

As another example of the excessive pressure release unit 2, as shown in FIG. 8 (*a*), a hole made in the wall 24 of the container is sealed up with the excessive pressure release valve 1, and the excessive pressure release valve 1 is fixed after an extending portion of the elastic rubber plate 10 of the excessive pressure release valve 1 is covered with a metal or plastic guide 26 extending from the wall 24 of the container so as not to disturb the release of the excessive pressure through the slit 11. As shown in FIG. 8 (*b*), the excessive pressure release valve 1 can be fitted into the wall 24 of the container etc., so that the excessive pressure release valve 1 is fixed by a guide 26 so as not to be displaced. When the guide 26 projecting from the outer surface of the wall 24 of the container hampers the installment or operation of other members, the excessive pressure release valve 1, as shown in FIG. 8 (*c*), can be fitted deeply into the wall 24 of the container so as for the guide 26 not to protrude from the outer surface of the wall 24 of the container.

Figure 9:
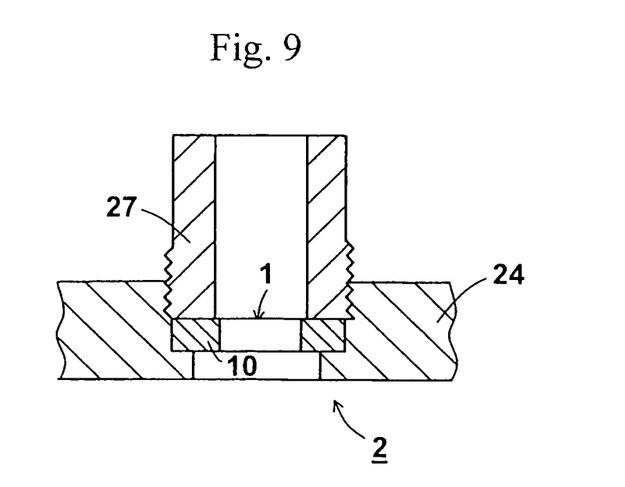
FIG. 9 is a cross-sectional side view of another excessive pressure release unit in operation.

As another example of the excessive pressure release unit 2, as shown in FIG. 9, a female screw is provided halfway in a hole formed in the wall 24 of the container. The elastic rubber plate 10 of the excessive pressure release valve 1 fitted into the hole is held by a hollow male screw 27 and fixed.

Figure 10:
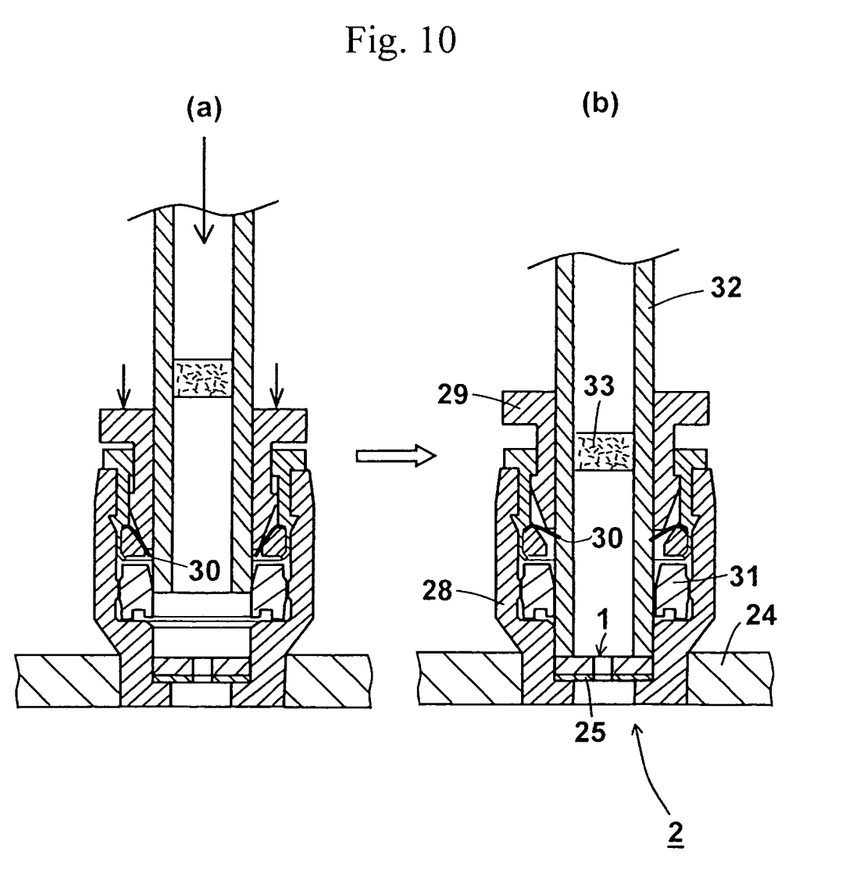
FIG. 10 is a cross-sectional side view of another actuated excessive pressure release unit.

As another example of the excessive pressure release unit 2, as shown in FIG. 10 (*b*), an external connector 28 to be connected to a pipe 32 is attached to the wall 24 of the container, and the excessive pressure release valve 1 is fitted into the external connector 28 and adhered to be fixed by way of the thermal adhesive film 25. A front edge of the pipe 32 contacts the excessive pressure release valve 1 with no space between them, and an outer circumference of the pipe 32 contacts an inner annular packing 31 in the external connector 28 with no space between them so that the inside of the container is tightly sealed. The pipe 32 is irreversibly fixed by engaging with a flexible claw 30 provided in the external connector 28. From the excessive pressure release valve 1, the thermal adhesion film 25 can be omitted. A spacer can be used on one or both surfaces of the excessive pressure release valve 1 for stabilizing the contact portion and for preventing a gas leak.

The pipe 32 can be made of metal, plastic or rubber. A filter 33 may be placed in the pipe 32.

The excessive pressure release unit 2 is used as follows. As shown in FIG. 10 (*a*) which shows a state of the unit 2 before use, when the pusher 29 is inserted into the external connector 28, the claw 30 is bent and the pipe 32 is inserted into the external connector 28 by way of the inner portion of the pusher 29. Further the front end of the pipe 32 is moved through the inside of the annular packing 31 and contacts the excessive pressure release valve 1. When the pusher 29 is pulled up, as shown in FIG. 10 (*b*), the claw 30 is restored to its original state by its flexibility such that the claw bites into the pipe 32, so that the pipe 32 is irreversibly fixed. The inside of the container is tightly sealed by the excessive pressure release unit 2. In addition, the excessive pressure release valve 1 and the annular packing 31 can be made into one body by combination.

Examples of the present excessive pressure release valve 1 and Comparative Examples which are outside the present invention are shown below.

Preparation of Silicone Rubbers having Different Durometer A Hardness

As ingredients, silicone oil-containing EL7396, EL7592, DS-8 (vulcanizing agent), WS7793 all of which are available from Wacker Asahikasei Silicone Co., Ltd. are used at compounding ratios shown in Table 1. Six different varieties of silicone rubbers having Durometer A hardness ranging from A28 to A73 (determined by JIS K6253) were prepared as shown in Table 1.

TABLE 1

| Durometer A Hardness | Silicone Rubber Composition | |
|---|---|---|
| A28/S | EL7396 | 100 parts by mass |
|  | DS-8 | 0.8 parts by mass |
| A35/S | EL7396 | 60 parts by mass |
|  | EL7592 | 40 parts by mass |
|  | DS-8 | 0.7 parts by mass |
| A45/S | EL7592 | 100 parts by mass |
|  | DS-8 | 0.6 parts by mass |
| A62/S | EL7592 | 40 parts by mass |
|  | WS7793 | 60 parts by mass |
|  | DS-8 | 0.6 parts by mass |
| A73/S | WS7793 | 100 parts by mass |
|  | DS-8 | 0.6 parts by mass |

EXAMPLE 1

Disk-shaped elastic rubber plates 10 each having a diameter of 5 mm and a thickness of 0.5 mm were prepared. At around the center of each disk, a straight-lined slits 11 having an entire length of 1.6 mm was formed using a thin blade to obtain an excessive pressure release valve 1.

As shown in FIG. 5, the excessive pressure release valve 1 was clamped, at a compression ratio of some 25%, between an upper side clamp 20 having a through hole and a lower side clamp 21 that had a dent and a through hole formed at a central portion of the dent. Into the through hole of the lower side clamp 21, the excessive pressure release valve 1 placed on a level-raising ring-like spacer 22 having a thickness of 0.59 mm and a hole formed at its central portion, was fitted. A pressure of nitrogen gas having a pressure rising rate of 20 kPa/s was applied on the lower surface side of the excessive pressure release valve 1. The working pressure for the excessive pressure was determined by detecting a leak detection pressure of 3 kPa. The results are shown in Table 2.

TABLE 2

| Durometer A Hardness | Thickness (mm) | Compression Ratio (%) | Assay Temperature (° C.) | Working Pressure (kPa) |
|---|---|---|---|---|
| A28/S | 0.53 | 23 | 23 | 110 |
| A35S | 0.56 | 27 | 23 | 165 |
| A45/S | 0.57 | 28 | 23 | 402 |
| A62/S | 0.56 | 27 | 23 | 601 |
| A73/S | 0.55 | 25 | 23 | 911 |

EXAMPLE 2

After producing the excessive pressure release valves 1 in the same manner as in Example 1, the working pressure to release the excessive pressure was determined in the same way as described in Example 1 except that the excessive pressure release valve 1 was clamped with a ring-like spacer 22 having a thickness of 0.50 mm and a hole formed at its central portion, at a compression ratio of about 10%. The results are shown in Table 3.

TABLE 3

| Durometer A hardness | Thickness (mm) | Compression Ratio (%) | Assay Temperature (° C.) | Working Pressure (kPa) |
|---|---|---|---|---|
| A28/S | 0.53 | 6 | 23 | 101 |
| A35S | 0.55 | 9 | 23 | 130 |
| A45/S | 0.55 | 9 | 23 | 219 |
| A62/S | 0.55 | 9 | 23 | 393 |
| A73/S | 0.56 | 11 | 23 | 698 |

EXAMPLE 3

The excessive pressure release valves 1 provided with a slit 11 having an entire length of 2.0 mm were produced in the same way as described in Example 1. The working pressure to release the excessive pressure was determined in the same way as described in Example 1 except that the excessive pressure release valve 1 was clamped with a ring-like spacer 22 having a thickness of 0.50 mm and a hole at its central portion, at a compression ratio of about 10%. The results are shown in Table 4.

TABLE 4

| Durometer A Hardness | Thickness (mm) | Compression Ratio (%) | Assay Temperature (° C.) | Working Pressure (kPa) |
|---|---|---|---|---|
| A28/S | 0.53 | 6 | 23 | 77 |
| A35S | 0.55 | 9 | 23 | 98 |
| A45/S | 0.55 | 9 | 23 | 181 |
| A62/S | 0.55 | 9 | 23 | 326 |
| A73/S | 0.56 | 11 | 23 | 588 |

EXAMPLE 4

After producing the excessive pressure release valves 1 in the same way as described in Example 1 except that the thickness was changed to 0.75 mm, the working pressure to release the excessive pressure was determined in the same way as described in Example 1 except that the excessive pressure release valve 1 was clamped with a ring-like spacer 22 having a thickness of 0.27 mm and a hole at its central portion, at a compression ratio of about 10%. The results are shown in Table 5.

TABLE 5

| Durometer A Hardness | Thickness (mm) | Compression Ratio (%) | Assay Temperature (° C.) | Working Pressure (kPa) |
|---|---|---|---|---|
| A28/S | 0.76 | 4 | 23 | 248 |
| A35S | 0.80 | 9 | 23 | 367 |
| A45/S | 0.81 | 10 | 23 | 612 |
| A62/S | 0.81 | 9 | 23 | 1124 |
| A73/S | 0.80 | 9 | 23 | 1688 |

EXAMPLE 5

After producing the excessive pressure release valves 1 having a Durometer A hardness of A35, the working pressure to release the excessive pressure was determined in the same way as described in Example 2 except that the assay temperature was changed and the working pressure was determined repeatedly at regular time intervals of one minute (duplicate measurement or repeating measurement at regular time intervals of one minute). The results are shown in Table 6.

TABLE 6

| Durometer A Hardness | Thickness (mm) | Compression Ratio (%) | Assay Temperature (°C.) | Working Pressure (kPa) | | | | |
|---|---|---|---|---|---|---|---|---|
| | | | | 1st | 2nd | 3rd | 4th | 5th |
| A35/S | 0.55 | 9 | 23 | 130 | 125 | 124 | 124 | 123 |
| A35/S | 0.55 | 9 | 80 | 133 | 123 | 123 | 127 | 127 |
| A35/S | 0.55 | 9 | 120 | 130 | 122 | 120 | 119 | 120 |
| A35/S | 0.55 | 9 | 160 | 128 | 118 | 118 | 116 | 115 |
| A35/S | 0.55 | 9 | 200 | 106 | 90 | 85 | 86 | 83 |

COMPARATIVE EXAMPLE 1

After producing the excessive pressure release valves 1 in the same way as described in Example 1 except that the excessive pressure release valve 1 had a Durometer A hardness of A35 and a small hole, in place of the slit, formed with a needle having a diameter of 1.25 mm. The working pressure to release the excessive pressure was determined in the same way as described in Example 2 except that the assay temperature was changed and the working pressure was determined repeatedly at regular time intervals of one minute. The results are shown in Table 7.

TABLE 7

| Durometer A Hardness | Thickness (mm) | Compression Ratio (%) | Assay Temperature (°C.) | Working Pressure (kPa) | | | | |
|---|---|---|---|---|---|---|---|---|
| | | | | 1st | 2nd | 3rd | 4th | 5th |
| A35/S | 0.55 | 9 | 23 | 103 | 99 | 101 | 101 | 83 |
| A35/S | 0.55 | 9 | 80 | 34 | 44 | 37 | 46 | 43 |
| A35/S | 0.55 | 9 | 120 | — | — | — | — | — |
| A35/S | 0.55 | 9 | 160 | — | — | — | — | — |
| A35/S | 0.55 | 9 | 200 | — | — | — | — | — |

EXAMPLE 6

As ingredients, 100 parts by mass of Nipol IR-2200 of isoprene rubber (available from Zeon Corporation), 1.0 parts by mass of stearic acid (available from Kao Corporation), 3.0 parts by mass of zinc oxide (available from Seido Chemical Industry Co., Ltd.), 15 parts by mass of MT black of carbon black (available from Cancerb Ltd., Canada), 0.8 parts by mass of Nocceler DM of dibenzothiazolyl disulfide (MBTS) (available from Ouchi Shinko Chemical Industrial), 0.8 parts by mass of Nocceler D of 1,3-diphenyl guanidine (DPG) (available from Ouchi Shinko Chemical Industrial), and 2.0 parts by mass of precipitated sulfur (available from Tsurumi Chemical Industry Co., Ltd.) were brended to obtain an isoprene rubber composition. After producing the excessive pressure release valves 1 having a Durometer A hardness of A38 using this composition, the working pressure to release the excessive pressure was determined in the same way as described in Example 1 except that the assay temperature was changed and the working pressure was determined repeatedly at regular time intervals of one minute. The results are shown in Table 8.

TABLE 8

| Durometer A Hardness | Thickness (mm) | Compression Ratio (%) | Assay Temperature (° C.) | Working Pressure (kPa) | | | | |
|---|---|---|---|---|---|---|---|---|
| | | | | 1st | 2nd | 3rd | 4th | 5th |
| A38/S | 0.55 | 9 | 23 | 125 | 121 | 120 | 119 | 119 |
| A38/S | 0.55 | 9 | 80 | 110 | 109 | 108 | 107 | 108 |
| A38/S | 0.55 | 9 | 120 | 106 | 115 | 98 | 65 | 101 |
| A38/S | 0.55 | 9 | 160 | 101 | 44 | 75 | 38 | 25 |
| A38/S | 0.55 | 9 | 200 | — | — | — | — | — |

EXAMPLE 7

The excessive pressure release valves 1 were produced as shown in Table 9 in the same way as described in Example 1 except that the excessive pressure release valves 1 had a constant thickness but a different diameter and slit length of the elastic rubber plate 10 using a silicone rubber that was designed to have a Durometer A hardness (JIS K6253) of A35/S. Then the working pressure to release the excessive pressure was determined in the same way as described in Example 1 except for the conditions shown in Table 9. The results are shown in Table 9.

TABLE 9

| A | B (mm) | C (mm) | D (mm) | E (%) | F (mm) | G (%) | H (° C.) | Working pressure (kPa) | | | | |
|---|---|---|---|---|---|---|---|---|---|---|---|---|
| | | | | | | | | 1st | 2nd | 3rd | 4th | 5th |
| A35/S | 0.55 | 5 | 1.60 | 32 | 0.50 | 9 | 23 | 130 | 125 | 124 | 124 | 123 |
| A35/S | 0.55 | 5 | 2.00 | 40 | 0.50 | 9 | 23 | 98 | 99 | 96 | 95 | 95 |
| A35/S | 0.76 | 5 | 1.60 | 32 | 0.27 | 9 | 23 | 367 | 356 | 350 | 351 | 348 |
| A35/S | 0.55 | 20 | 0.60 | 3 | 0.50 | 9 | 23 | 188 | 201 | 179 | 167 | 149 |
| A35/S | 0.55 | 20 | 1.00 | 5 | 0.50 | 9 | 23 | 180 | 181 | 176 | 175 | 174 |
| A35/S | 0.55 | 5 | 4.00 | 80 | 0.50 | 9 | 23 | 25 | 23 | 24 | 23 | 23 |
| A35/S | 0.55 | 5 | 4.50 | 90 | 0.50 | 9 | 23 | 20 | 3 | 7 | 2 | 3 |
| A35/S | 0.55 | 1 | 0.50 | 50 | 0.50 | 9 | 23 | 256 | 129 | 99 | 77 | 80 |
| A35/S | 0.55 | 2 | 1.00 | 50 | 0.50 | 9 | 23 | 201 | 199 | 200 | 194 | 193 |
| A35/S | 0.55 | 40 | 2.00 | 5 | 0.50 | 9 | 23 | 91 | 90 | 87 | 88 | 87 |
| A35/S | 0.55 | 50 | 2.00 | 4 | 0.50 | 9 | 23 | 88 | 87 | 89 | 86 | 86 |

A: Durometer A Hardness, B: Thickness, C: Diameter, D: Entire Slit Length, E: D × 100/C, F: Space Thickness, G: Compression Ratio, H: Assay Temperature,

EXAMPLE 8

The excessive pressure release valves 1 were produced as shown in Table 10 in the same way as described in Example 1 except that the excessive pressure release valves 1 had no spacer but was adhered by adhesive agents (trade name, "Aron Alpha", available from Toagosei Co., Ltd.) using a silicone rubber that is designed to have a Durometer A hardness (JIS K6253) of A35Is. Then the working pressure to release the excessive pressure was determined in the same way as described in Example 1 except for the conditions shown in Table 10. The results are shown in Table 10.

TABLE 10

| A | B (mm) | C (mm) | D (mm) | E (%) | F (mm) | G (%) | H (° C.) | Working pressure (kPa) | | | | |
|---|---|---|---|---|---|---|---|---|---|---|---|---|
| | | | | | | | | 1st | 2nd | 3rd | 4th | 5th |
| A35/S | 20 | 40 | 30.00 | 75 | Adhesive bonding | | 23 | 130 | 125 | 124 | 124 | 123 |

A: Durometer A Hardness, B: Thickness, C: Diameter, D: Entire Slit Length, E: D × 100/C, F: Space Thickness, G: Compression Ratio, H: Assay Temperature

EXAMPLE 9

The excessive pressure release valves 1 were produced as shown in Table 12 in the same way as described in Example 1 except that KE931-U, KE941-U and C-8 (a vulcanizing agent) available from Shin-Etsu Chemical Co., Ltd., and all of which do not contain silicone oil were used in place of the ingredients in Example 1. The silicone rubber composition is shown in Table 11. Then the working pressure to release the excessive pressure was determined in the same way as described in Example 1 except for the condition shown in Table 12. The results are shown in Table 12.

TABLE 11

| Durometer A hardness | Silicone rubber composition | |
|---|---|---|
| A35/S | KE931-U | 50 parts by mass |
| | KE941-U | 50 parts by mass |
| | C-8 | 2.0 parts by mass |

TABLE 12

| A | B (mm) | C (mm) | D (mm) | E (%) | F (mm) | G (%) | H (° C.) | Working pressure (kPa) | | | | |
|---|---|---|---|---|---|---|---|---|---|---|---|---|
| | | | | | | | | 1st | 2nd | 3rd | 4th | 5th |
| A35/S | 0.55 | 5 | 1.60 | 32 | 0.50 | 9 | 23 | 149 | 127 | 125 | 122 | 124 |

A: Durometer A Hardness, B: Thickness, C: Diameter, D: Entire Slit Length, E: D × 100/C, F: Space Thickness, G: Compression Ratio, H: Assay Temperature As is apparent from Tables 2-6 and 8, the present excessive pressure release valves surely worked in a wide excessive pressure range from a low to high pressure.

As is apparent from Table 2, the working pressure increased with an increase in the Durometer A hardness or hardness even though the thickness and compression ratio thereof was the same. From Table 3, the same conclusion is seen.

As is apparent from the comparison between the excessive pressure release valves having the same Durometer A hardness in Tables 2 and 3, the working pressure of the excessive pressure release valves became high with an increase in the compression ratio. The excessive pressure release valves were made of silicone rubber, accordingly the compression pressure was considered to act as fastening stress on the surfaces of the slit. Therefore, it would appear that when the slit length was too long or too short, the compression pressure would not fully act as the fastening stress. Accordingly the working pressure of the excessive pressure release valve was able to be adjusted by selecting ingredient having such appropriate physical properties as seen in the silicone rubber or by adjusting the compression pressure.

As is apparent from the comparison between the excessive pressure release valves having almost the same Durometer A hardness, thickness and compression ratio in Tables 3 and 4, the working pressure of the excessive pressure release valves in Table 4 which had an entire slit length longer than that in Table 3 became low.

As is apparent from the comparison between the excessive pressure release valves having almost the same Durometer A hardness and compression ratio in Tables 3 and 5, the working pressures of the excessive pressure release valves in Table 5 which had a thickness thicker than that in Table 3 became high.

As is apparent from Table 6, the higher the assay temperatures were, the lower the working pressure became, even though the excessive pressure release valves had almost the same Durometer A hardness, thickness and compression ratio. However, there were almost no changes in the working pressure in the repeating measurements at each temperature.

As is apparent from the comparison between the excessive pressure release valves having the same Durometer A hardness, thickness, compression ratio and assay temperature in Tables 6 and 7, the excessive pressure release valves having not a slit but a small hole that is outside the present invention in Table 7 had a working pressure lower than that of the present excessive pressure release valves in Table 6. Further, variation in the working pressure in the repeating measurements became large and the reliability of the working pressure became poor.

As shown in Table 7, the excessive pressure release valve having a small hole worked normally at a room temperature of 23° C., but it was observed that at a high temperature of 80° C., the working pressure fell sharply Further, at temperatures of 120° C., 160° C. and 200° C., the determination of the working pressure could not be carried out because the small hole remained open and did not return to its original shape or position.

As shown in Table 8, the excessive pressure release valves made of isoprene rubber worked normally in the repeating measurement at temperatures ranging from 23° C. (approximately room temperature) to 120° C., but in the repeating measurements at a higher temperature of 160° C., sharp falls in the working pressure were observed with increase in the test number. At a still higher temperature of 200° C., the slit remained open and could not return to its original shape or position, so that the measurement could not be carried out.

As is clear from the comparison between the excessive pressure release valves having the same Durometer A hardness, compression ratio and assay temperature in Tables 6 and 8, the excessive pressure release valve made of silicone rubber in Table 6 surely worked at about a constant working pressure at up to 200° C. in the repeating measurements. However, other release valves made of isoprene rubber in Table 8 properly worked at about a certain working pressure when measured at lower temperatures of up to 120° C.

As shown in Table 9, when the proportion of the entire slit length in the diameter became 3% (i.e. less than 5%), the excessive pressure release valves tended not to work at a constant working pressure in the repeating measurement. When the proportion of the entire slit length in the diameter became 90% (i.e. more than 80%), the release valve did not work at a constant working pressure in the repeating measurement. When the diameter became 1 mm (i.e. less than 2 mm), the release valve did not work at a constant working pressure in the repeating measurement. When the diameter became 50 mm (i.e. more than 40 mm), the release valve surely worked at a certain working pressure in the repeating measurement, but the size became large and cost would rise especially for the containers of small battery cells, being undesirable for downsizing technique.

As shown in Table 10, the excessive pressure release valve having a thickness of 20 mm and a diameter of 40 mm, which were thought to be an upper limit size, was adhered with adhesives without using a spacer. The excessive pressure release valve surely worked at about a constant working pressure in the repeating measurement.

As shown in Tables 11 and 12, when silicone rubber containing no silicone oil was used, the working pressure dropped sharply at its initial stage of the repeating measurement but after that it worked at a certain constant working pressure.

As described above, the present excessive pressure release valve can be adjusted so as to make the excessive pressure release valve surely, accurately and repeatedly work at a desired excessive pressure to be released and as many time as desired, by appropriately selecting the thickness and material of the elastic rubber plate, its compression ratio, the shape and entire length of the slit and the assay temperature.

INDUSTRIAL APPLICABILITY

The present excessive pressure release valve is small but can safely release an excessive pressure ranging from a low to a high pressure, so that it can be used as a safety valve or check valve to release an excessive pressure of an oversupplied hydrogen fuel in batteries for fuel cells or secondary batteries. Further it can be used for containers for sparkling beverages such as beer and carbonated beverages, preservation containers for gas generative agents such as hydrogen peroxide, air piping, gas piping or safety valves to release an excess gas. In particular, it can be used as safety valves and check valves for battery cells of small cell-phones, laptop personal computers, portable radios, portable TV sets and jacklights. Among them, it can be useful for an excessive pressure release valve for fuel cells which uses hydrogen as fuel and is incorporated into small type portable radios or laptop personal computers.

What is claimed is:

1. An excessive pressure release valve which comprises:
an elastic rubber plate having an upper surface and a lower surface; and
a reversibly openable and closable slit passing through the upper and lower surfaces of the elastic rubber plate for releasing an internal excessive pressure to the external world when the slit is pushed and opened toward the upper surface side by the internal excessive pressure stressing on the lower surface side of the elastic rubber plate,
wherein the elastic rubber plate is made of a silicone rubber containing 1 to 20% by mass silicone oil,
the elastic rubber plate has a thickness ranging from 0.3 mm to 20 mm, a diameter ranging from 2 mm to 40 mm, a Durometer A hardness ranging from A20 to A80 according to Japanese Industrial Standard K6253, and
the slit having a length that is 5 to 80% of the diameter, and the slit also having wall surfaces, wherein the silicone oil saturates the wall surfaces of the slit and facilitates opening and closing of the slit, and
wherein the silicone rubber is methyl vinyl silicone rubber and the silicone oil is methyl phenyl silicone oil, or the silicone rubber is methyl phenyl vinyl silicone rubber and the silicone oil is dimethyl silicone oil.

2. The excessive pressure release valve according to claim 1, wherein the slit is shaped into a straight line, U-shape, V-shape, S-shape or cross line.

3. The excessive pressure release valve according to claim 1, wherein the elastic rubber plate has a thick portion at a peripheral portion thereof.

4. The excessive pressure release valve according to claim 1, wherein the elastic rubber plate further has:
a dent at a central portion of the lower surface side of the elastic rubber plate and the slit passing through a central flat portion of the dent, or
a mound at a central portion on the upper surface side of the elastic rubber plate and the slit passing through a central flat portion of the mound.

5. The excessive pressure release valve according to claim 1, wherein the silicone rubber is methyl vinyl silicone rubber and the silicone oil is methyl phenyl silicone oil.

6. The excessive pressure release valve according to claim 1, wherein the silicone rubber is methyl phenyl vinyl silicone rubber and the silicone oil is dimethyl silicone oil.

7. An excessive pressure release unit comprising:
a closed-system of a container, piping and/or an external connector to be connected thereto, and
an excessive pressure release valve mounted on the closed-system; wherein the excessive pressure release valve has an elastic rubber plate for releasing an internal excessive pressure in the closed-system,
the elastic rubber plate has an upper surface and a lower surface and a reversibly openable and closable slit passing through the upper and lower surfaces of the elastic rubber plate for releasing an internal excessive pressure to the external world when the slit is pushed and opened toward the upper surface side by the internal excessive pressure stressing on the lower surface side of the elastic rubber plate,
wherein the elastic rubber plate is made of a silicone rubber containing 1 to 20% by mass silicone oil,
the elastic rubber plate has a thickness ranging from 0.3 mm to 20mm, a diameter ranging from 2 mm to 40mm, a Durometer A hardness ranging from A20 to A80 according to Japanese Industrial Standard K6253, and
the slit having a length that is 5 to 80% of the diameter, and the slit also having wall surfaces, wherein the silicone oil saturates the wall surfaces of the slit and facilitates opening and closing of the slit, and
wherein the silicone rubber is methyl vinyl silicone rubber and the silicone oil is methyl phenyl silicone oil, or the silicone rubber is methyl phenyl vinyl silicone rubber and the silicone oil is dimethyl silicone oil.

8. The excessive pressure release unit according to claim 7, wherein the excessive pressure release valve is fixed to the container, piping and/or external connecter to be connected to them by way of adhesion to the container, piping and/or external connector to be connected to them using a thermal adhesive film or an adhesive agent attached to the lower surface side of the elastic rubber plate; or by way of covering of an outer edge portion of the elastic rubber plate using a guide attached to the container, piping and/or external connector to be connected to them.

9. The excessive pressure release unit according to claim 7, wherein the excessive pressure releasing valve is fixed to the container, piping and/or external connector by way of fitting of the elastic rubber plate into the container, piping and/or external connector to be connected to them, or by way of holding of an outer edge portion of the elastic rubber plate using a washer, hollow pipe or hollow screw.

10. The excessive pressure release unit according to claim 7, wherein the elastic rubber plate is compressed and subjected to a resulting compression pressure so that the excessive pressure to be released is adjusted based on the compression pressure.

11. The excessive pressure release unit according to claim 7, wherein the silicone rubber is methyl vinyl silicone rubber and the silicone oil is methyl phenyl silicone oil.

12. The excessive pressure release unit according to claim 7, wherein the silicone rubber is methyl phenyl vinyl silicone rubber and the silicone oil is dimethyl silicone oil.

* * * * *